Dec. 31, 1935.  E. PRAEGER  2,025,895
GARDEN HOSE SUPPORT
Filed April 2, 1934
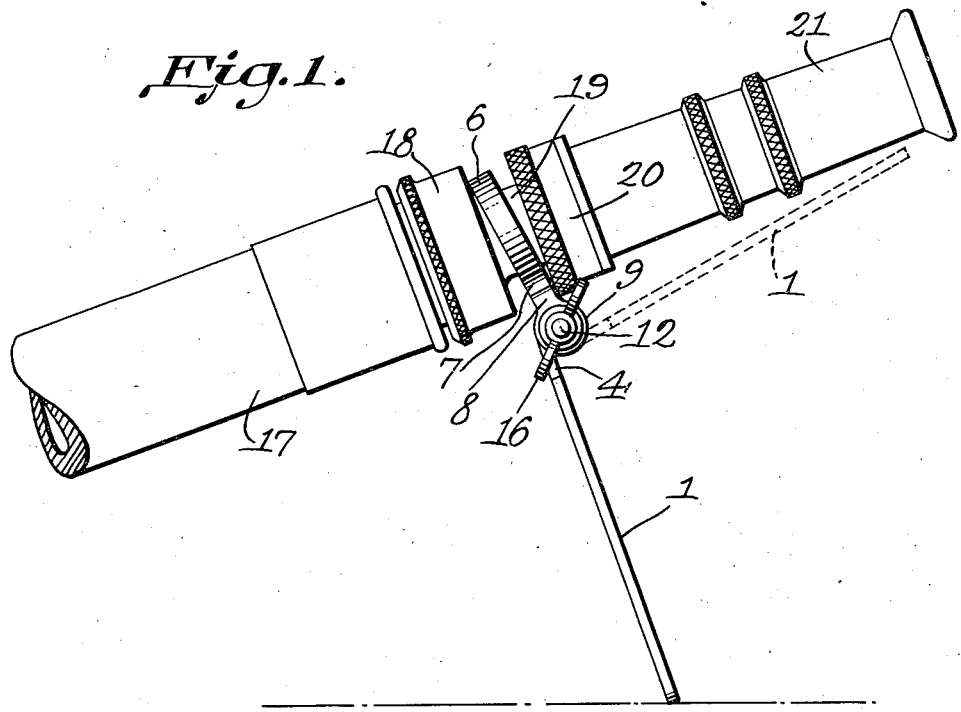
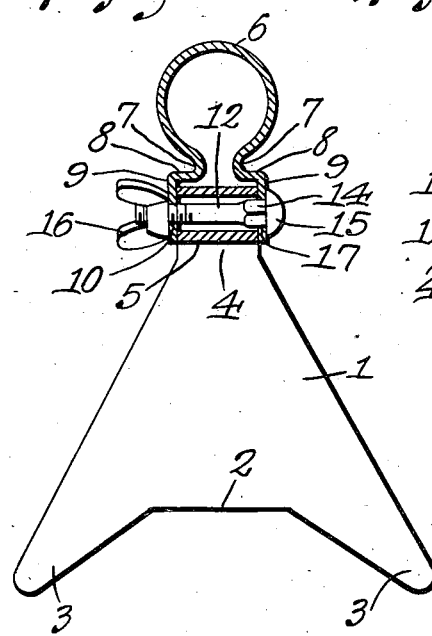
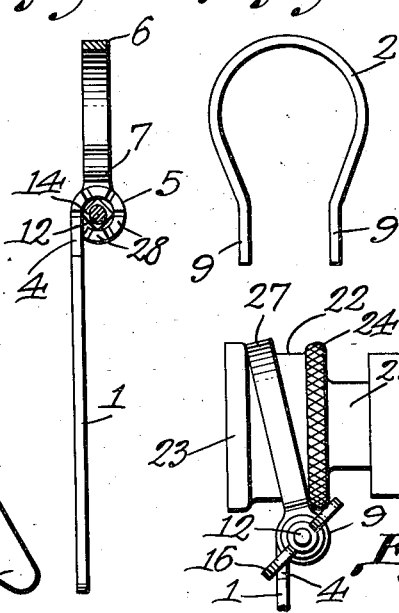
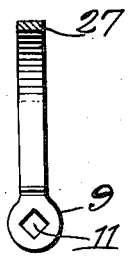
E. Praeger Inventor
By C. A. Snow & Co. Attorneys.

Patented Dec. 31, 1935

2,025,895

UNITED STATES PATENT OFFICE 2,025,895

GARDEN HOSE SUPPORT

Ewald Praeger, San Antonio, Tex.

Application April 2, 1934, Serial No. 718,730

2 Claims. (Cl. 248—84)

The device forming the subject matter of this application is a holder or support for garden hose. The invention aims to provide a device of the class described which will hold the hose in position for watering, without forcing the support into the ground, the device keeping its place, because the loop which extends about the nozzle is larger in diameter than the nozzle, thereby permitting the nozzle to have a little play, as the water flows through it, without creating any appreciable movement in the support.

The invention aims to provide a device of the class described which is light, compact, always ready for use, and capable of being applied in various ways to a hose nozzle.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows in side elevation, a device of the class described connected to the nozzle of a hose, such as a garden hose;

Fig. 2 is an elevation of the device per se, parts being in section;

Fig. 3 is a side elevation wherein a part of the loop has been broken away;

Fig. 4 is an elevation showing how the loop can be changed and enlarged, for mounting as shown in Fig. 6;

Fig. 5 is a section of the loop as disclosed in Fig. 4;

Fig. 6 is a side elevation showing the device mounted on a nozzle in a way which differs slightly from the disclosure of Fig. 1.

The device forming the subject matter of this application preferably is made of metal throughout. It comprises a support 1, preferably in the form of an approximately triangular plate, having a recess 2 in its lower edge, the recess defining feet 3. At its upper end, the support 1 has a reduced head 4, provided with parallel edges, and this head is turned upon itself, to form a tubular eye 5.

The loop is marked by the numeral 6 and is of annular form. On its lower part, it has inset portions 7, merging into outstanding arms 8 having parallel, disk-like fingers 9, one of which has a circular hole 10, and the other of which has a polygonal or rectangular hole 11. The loop 6 is placed on the support 1, with the fingers 9 at opposite ends of the tubular eye 5 on the support 1.

A securing element, such as a bolt 12 is provided, the bolt passing through the holes 10 and 11 of the disk-like fingers 9 and through the eye 5. The squared portion 14 of the bolt or securing element 12 is received in the correspondingly-shaped hole 11 of one of the fingers 9, and the bolt, thus, is held against rotating when the wing nut 16 or equivalent device is threaded on the bolt. The head 15 of the bolt engages the finger 9 which has the polygonal opening 11. Obviously, the loop 6 can be tilted from front to back, to adjust the position of the hose 17 and the nozzle with respect to the surface of the ground, and by tightening up the wing nut 16, the loop 6 will be held in any position to which it has been adjusted. In order to enhance the hold of the eye 5 on one of the fingers 9, for instance the finger which has the circular hole 10, the corresponding end of the eye 5 may be provided with blunted teeth 28, indicated in Fig. 3.

Upon the hose 17 is threaded the base 18 of the nozzle, the base having a reduced neck 19 which is threaded into the butt 20 of the nozzle tip 21, the nozzle tip 21 being rotatable to vary the character of the stream of water, in a way well understood by everyone. The base 18 and the butt 20 form spaced circumferential shoulders in the nozzle.

The loop 6 is placed about the neck 19, between the butt 20 of the nozzle tip 21, and the base 18. The diameter of the loop 6 is considerably larger than the diameter of the neck 19, and, consequently, the hose 17 can squirm about, and impart movement to the nozzle, without imparting a corresponding movement to the support 1 and the loop 6. It is unnecessary, therefore, to embed the lower end of the support 1 in the ground, and the device will keep its place, even on a hard surface, such as a concrete pavement.

The nozzle is not constructed always as shown in Fig. 1. For instance, referring to Fig. 6, the base 22 of the nozzle may have spaced beads or shoulders 23 and 24, the neck of the base being marked by the numeral 25, and the nozzle tip being shown at 26. The operator may wish to mount the loop, designated by the numeral 27, on the base 22, between the beads 23 and 24, and still have the loop 27 large enough so that the nozzle will have the aforesaid play in the loop. Under such circumstances, the inset portions 7 of Fig. 2 may be straightened out, thereby giving added material, by which the size of the loop may be increased, as shown at 27, the play of the nozzle still being retained, with respect to the loop, as has been hereinbefore set forth.

The construction of the device is simple, but the article will be found thoroughly effective for the ends in view. Owing to the fact that the nozzle has play in the loop, the support 1 will not be overturned by the squirming action of the hose.

Having thus described the invention, what is claimed is:

1. A holder for a hose nozzle which has spaced shoulders connected by a reduced neck, the holder embodying a plate-like support, the lower edge of which is shaped to rest on the surface of the ground, a loop of such diameter as to receive the neck and of less width than the distance between the shoulders, the loop terminating in depending fingers, and a clamping device connecting the fingers, the support being provided with an eye, receiving the clamping device and located between the fingers, the eye being of such length as to limit the contraction of the loop to a diameter greater than that of the neck and less than the diameter of the shoulders, thereby to form a loose but permanent connection between the holder and the nozzle, enabling the loop to shift circumferentially of the neck, and the support to swing circumferentially of the neck, automatically, into depending, ground-engaging position, and enabling the nozzle to have a squirming movement with respect to the loop.

2. A nozzle holder constructed in accordance with claim 1, and further characterized by the provision of inwardly-extended, laterally-curved and bendable side portions, incorporated between the loop and the fingers and affording normally-unused surplus material, capable of being flattened out to increase the size of the loop, the eye still retaining its function as a means for limiting the contraction of the loop.

EWALD PRAEGER.